May 16, 1961 H. A. DUVALL ET AL 2,984,447
WIRING DUCT HANGER
Original Filed Oct. 22, 1952 2 Sheets-Sheet 1

INVENTORS
HAROLD A. DUVALL.
ERNEST MILLER.
BY

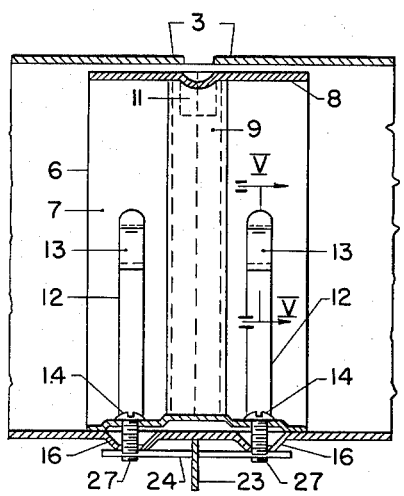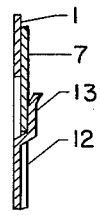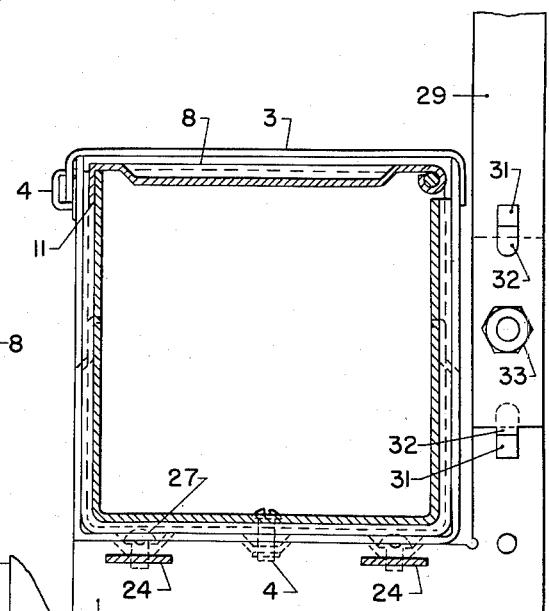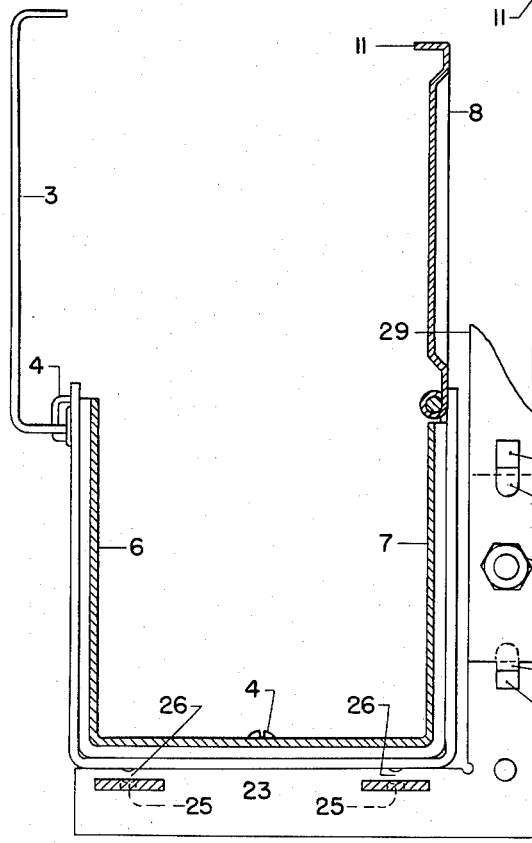

United States Patent Office 2,984,447
Patented May 16, 1961

2,984,447
WIRING DUCT HANGER

Harold A. Duvall and Ernest Miller, Los Angeles, Calif., assignors to Square D Company, Executive Plaza, Park Ridge, Ill., a corporation of Michigan Original application Oct. 22, 1952, Ser. No. 316,177, now Patent No. 2,917,083, dated Dec. 15, 1959. Divided and this application July 14, 1958, Ser. No. 748,437

5 Claims. (Cl. 248—317)

This invention relates to a conduit system for electrical conductors, the system being made up of a plurality of sheet metal duct sections having openable covers. An object of the invention is to provide improved means for mounting the duct sections. This application is a division of our co-pending application Serial No. 316,177, filed October 22, 1952 which issued December 15, 1959 as Patent No. 2,917,083 and is assigned to the assignee of the present invention.

An other object of this invention is the provision of a conduit system for electrical conductors made up of a plurality of sheet metal duct sections in which the mounting means for the sections provides for complete access into the conduit system throughout its length so that wires and cables may be laid in the conduit without threading through junctions of the section.

A more specific object of the invention is to provide an improved separable hanger for electrical distribution duct which allows for assembly of the duct and attachment of one portion of the hanger thereto at a comfortable working level and further allows for the installation of another portion of the hanger to a suitable support, the assembled duct then being elevated to installation position whereupon the one portion of the hanger engages the other portion of the hanger to support the duct temporarily until the two portions of the hanger can be secured together permanently.

Other objects and features of the invention will be readily apparent to those skilled in the art from the specification and appended drawings illustrating certain preferred embodiments in which:

Figure 4 is a partial longitudinal sectional view on the line IV—IV of Figure 1.

Figure 5 is a detail sectional view on the line V—V of Figure 4.

Figure 6 is a transverse sectional view on the line VI—VI of Figure 1.

Figure 7 is a view similar to Figure 6 with the cover and adjacent connector side shown in open position to provide access to the interior of the conduit.

Figure 1:
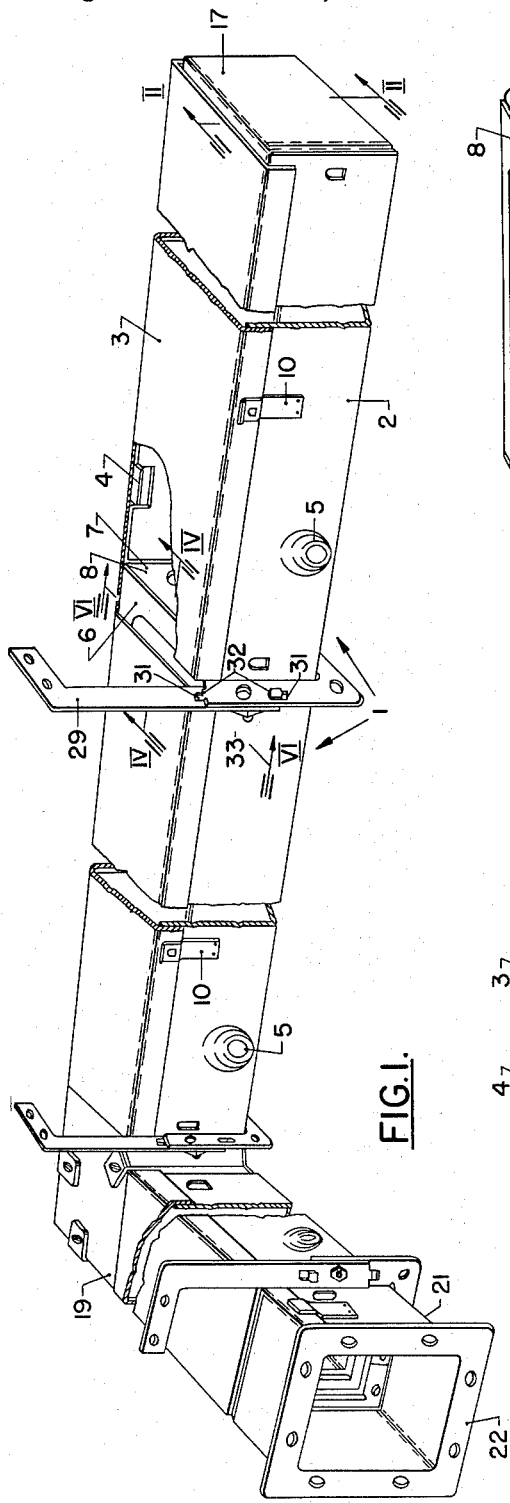
Figure 1 is a perspective view of a conduit system according to the present invention.

The conduit system shown in the drawing is made up of a plurality of duplicate sheet metal duct sections 1 formed with U-shaped body portions 2 having openable covers 3 mounted thereon by loop and slot hinge mountings 4 at one edge of the U-shaped body portion 2, the cover being latched in closed position by a latch 10 carried by the leg of the body portion 2 opposite the hinge 4 and engaging the flange at the edge of the cover 3, as shown more particularly in Figure 1. The walls of the body portion 2 are provided with a multiplicity of knockout portions 5 disposed along the length of the section in relatively close spacing and providing ready access for wires and cables into the interior of the duct.

Figure 3:
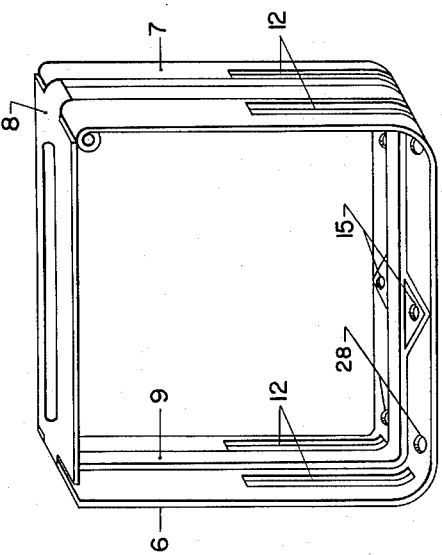
Figure 3 is a perspective view of a connector strap used to join adjacent ends of duct sections.

The adjacent ends of the individual duct sections are joined by connector straps 6 shown in perspective in Figure 3 as comprising a U-shaped sheet metal strap 7 having a closing leg 8 hingedly mounted at one edge of the strap 7, with the hinge extending at right angles to the plane of the U and parallel to the walls of the strap. The central portion of the strap 7 is provided with a bead 9 which rigidifies the strap and also presents a smooth surface at the interior of the duct for engagement with wires within the duct. The end of the leg 8 opposite its hinge is provided with a tongue 11 which engages in the concave portion of the bead 9 to form the strap 7 and leg 8 into a substantially rigid rectangular structure.

The opposite legs of the U-shaped strap 7 are provided with pairs of slots 12 within which are received clip fingers 13 pressed from the side wall of the main body portion 2 of the duct section, as more particularly shown in Figures 4 and 5. At the end of the slots 12, strap 7 becomes interlockingly engaged with the ends of the duct sections with the side walls of the strap 7 disposed between the interior side wall surfaces of the duct section body portion 2 and the opposed surfaces of the fingers 13. A pair of studs 14 having their shanks passing freely through the openings 15 in the bight wall of the strap 7 and threaded into extruded portions 16 in the bight walls of the duct body portions 2 serve to hold the connector strap in interlocking engagement with the side walls of the duct sections and also serve to connect the bight walls of the duct sections to the bight wall of the connector strap.

Figure 2:
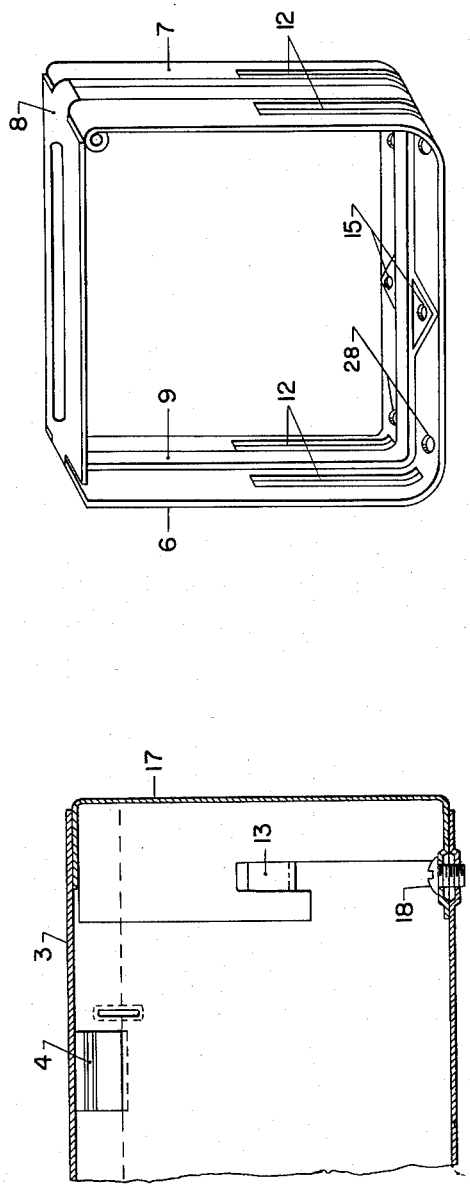
Figure 2 is a partial longitudinal sectional view on the line II—II of Figure 1.

The section of Figure 2 indicates closure of the right hand end of the conduit of Figure 1. Here, the pressed out finger 13 on the side wall of the duct section adjacent the end thereof interlocks with the side wall of the generally cup-shaped member 17 which is further connected and maintained in the interlocked position by means of a stud 18 threaded into the bight wall of the duct section.

A right angle bend corner section is shown on the drawing at 19, and it will be appreciated that any desired arrangement of junction boxes may be provided similar to those provided in connection with the conduit system illustrated in Patent No. 1,992,574 granted February 26, 1935, Figure 1 herein showing a left hand end section 21 having a flange 22 for connection to a duct system of the type illustrated in the patent.

To support the conduit system of the present invention, there may be provided an L-shaped mounting hanger 23 having loosely mounted in slots in the base leg thereof a pair of short plates 24 provided with central holes 25 therethrough into which there are upset portions 26 of the hanger 23 so as to mount the plates 24 loosely in the hanger leg for free movement relative thereto in several directions while being retained in assembled relation. To mount the duct system on the hangers 23 there are provided studs 27 whose heads engage the inner surfaces of the bight walls of the duct sections and whose shanks thread into openings adjacent the ends of the plates 24. The heads of the studs 27 pass freely through clearance holes 28 in the bight of the strap 7 and are readily accessible to a tool inserted through the clearance openings. Thus, the plates 24 and studs 27 serve to further connect the adjacent ends of duct sections independent of the connector strap.

The hanger 23 may be bolted directly to a supporting member by suitable bolts passing through the openings shown therein; but, as shown in the drawing, there is provided a second hanger member 29 also of L-shape and connected to the hanger 23 in inverted relation. The connecting legs of the hangers have openings 31 therethrough and the ends of the bracket legs are provided with hooks 32 passing through and engaging the adjacent edges of the openings 31 when the hangers are pulled apart after assembly into interlocking position where they are maintained by a bolt 33 passing therethrough. The other leg of the hanger member 29 may be connected to any desired support such as a ceiling or wall bracket.

A section junction of the conduit system of this invention is shown in normal closed position in Figure 4 with the ends of the duct sections rigidly connected together through the interlocking of the side walls of the strap and duct sections by the interlocking slots 12 and fingers 13 and the connecting of the bight walls through the studs 14. The covers 3 may be readily swung open on the hinges 4 in the manner shown in Figure 7 when the latches 10 are disengaged. The side 8 of the strap 7 may then be swung open about its hinge at the edge of the strap, rotating about an axis parallel to the axis of rotation of the cover 3 into the position also shown in Figure 7. In this position it is clear that the entire length of the duct is open to access and that wiring and cables may be directly laid therein without the necessity of threading through junction flanges as in the aforenoted Patent No. 1,992,574.

When the leg 8 is in closed position, as shown in Figure 6, the tongue 11 is received within the concave portion of the adjacent end of the bead 9 to interlock the leg 8 with the side of the strap 7 opposite its hinge to form a substantially rigid rectangular structure. With the tongue 11 between the side walls of both the strap and duct sections, the leg 8 thus serves to rigidify the duct and prevent spreading and collapse of the side walls thereof as well as providing a surface against which the edges of the covers 3 engage, thus preventing access into the duct interior through the space between the cover edges.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A separable hanger for an electrical distribution duct, said hanger comprising a generally L-shaped duct support member and a generally L-shaped hanger member, said duct support member having a platform leg and a connecting leg extending angularly with respect to each other, said hanger member having an attachment leg and a connecting leg extending angularly with respect to each other, a duct supporting platform on said platform leg for supporting a distribution duct, attachment means on said attachment leg of said hanger member for attaching said hanger member to a supporting structure, a hole in the connecting leg of said duct support member and a hole in the connecting leg of said hanger member, a hook on one of said connecting legs spaced from the hole in said one of said connecting legs, and a cutout portion in the other of said connecting legs for acceptance of said hook and spaced from the hole in said other of said connecting legs, said cutout portion having an edge face adapted to be engaged by said hook, said holes being so spaced from their respective hook or cutout that said holes are in axial alignment when said hook is engaged with said edge face, and said holes being of substantially the same size and shape so that the entire wall portion of one of said holes is in substantial alignment with the entire wall portion of the other hole when said holes are in said axial alignment.

2. A separable hanger for an electrical distribution duct, said hanger comprising a generally L-shaped duct support member and a generally L-shaped hanger member, said duct support member having a platform leg and a connecting leg extending angularly with respect to each other, said hanger member having an attachment leg and a connecting leg extending angularly with respect to each other, a duct supporting platform on said platform leg for supporting a distribution duct, attachment means on said attachment leg of said hanger member for attaching said hanger member to a supporting structure, a hole in the connecting leg of said duct support member and a hole in the connecting leg of said hanger member, a hook on each of said connecting legs spaced from the hole in its respective connecting leg, and a cutout portion in each of said connecting legs spaced from the hole in its respective connecting leg for acceptance of the hook on the other of said connecting legs, each of said cutout portions having an edge face adapted to be engaged by the hook on the other of said connecting legs, said holes being spaced from their respective hook and cutout so that said holes are in axial alignment when said hooks are engaged with said edge faces, and said holes being of substantially the same size and shape so that the entire wall portion of one of said holes is in substantial alignment with the entire wall portion of the other hole when said holes are in said axial alignment.

3. The combination according to claim 2 wherein the major planar surfaces of the connecting legs lie in parallel planes, said planes being transverse to the longitudinal axis of the said distribution duct when the latter is associated with the duct support member.

4. A separable hanger for an electrical distribution duct, said hanger comprising a generally L-shaped duct support member and a generally L-shaped hanger member, said duct support member having a platform leg and a connecting leg extending angularly with respect to each other, said hanger member having an attachment leg and a connecting leg extending angularly with respect to each other, a duct supporting platform on said platform leg for supporting a distribution duct, attachment means on said attachment leg of said hanger member for attaching said hanger member to a supporting structure, a hole in the connecting leg of said duct support member and a hole in the connecting leg of said hanger member, a hook on the connecting leg of said hanger member spaced from said hole in said connecting leg, and a cutout portion in the connecting leg of said duct support member for acceptance of said hook and spaced from the hole in said connecting leg of said duct supporting member, said cutout portion having an edge face adapted to be engaged by said hook, said holes being so spaced from their respective hook or cutout that said holes are in axial alignment when said hook is engaged with said edge face, and said holes being of substantially the same size and shape so that the entire wall portion of one of said holes is in substantial alignment with the entire wall portion of the other hole when said holes are in said axial alignment.

5. A separable hanger for an electrical distribution duct, said hanger comprising a generally L-shaped duct support member and a generally L-shaped hanger member, said duct support member having a platform leg and a connecting leg extending angularly with respect to each other, said hanger member having an attachment leg and a connecting leg extending angularly with respect to each other, a duct supporting platform on said platform leg for supporting a distribution duct, attachment means on said attachment leg of said hanger member for attaching said hanger member to a supporting structure, a hole in the connecting leg of said duct support member and a hole in the connecting leg of said hanger member, a hook on the connecting leg of said duct support member spaced from said hole in said connecting leg, and a cutout portion in the connecting leg of said hanger member for acceptance of said hook and spaced from the hole in said connecting leg of said hanger member, said cutout portion having an edge face adapted to be engaged by said hook, said holes being so spaced from their respective hook or cutout that said holes are in axial alignment when said hook is engaged with said edge face, and said holes being of substantially the same size and shape so that the entire wall portion of one of said holes is in substantial alignment with the entire wall portion of the other hole when said holes are in said axial alignment.

References Cited in the file of this patent

UNITED STATES PATENTS

| | | | |
|---|---|---|---|
| 1,132,999 | Beers | Mar. 23, | 1915 |
| 1,144,593 | Heiser | June 29, | 1915 |
| 2,121,213 | Small | June 21, | 1938 |
| 2,214,388 | Summers | Sept. 10, | 1940 |
| 2,297,869 | Biller | Oct. 6, | 1942 |